(No Model.)
R. R. WAITZ.
ORE FURNACE.
No. 251,007. Patented Dec. 13, 1881.
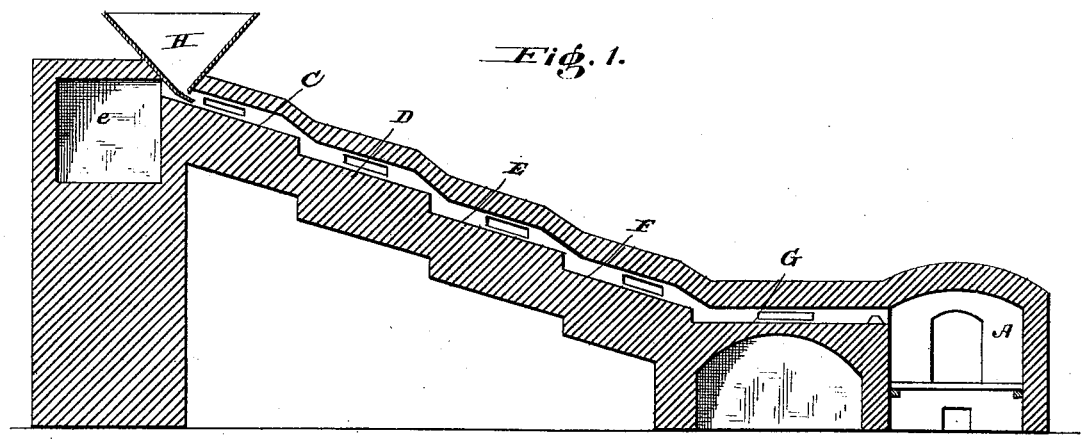
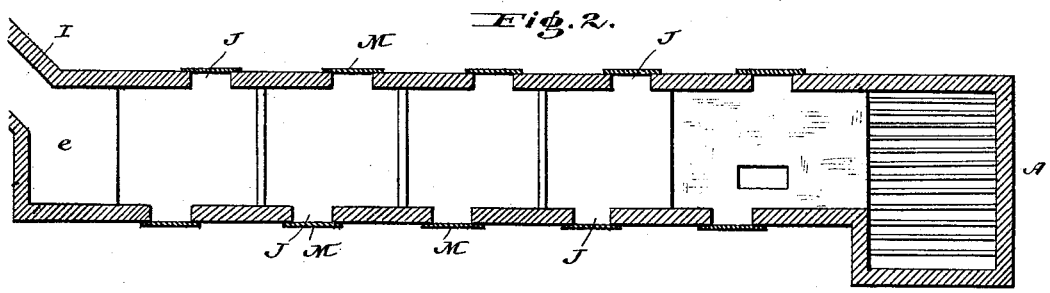
Witnesses:
All Long
W. B. F. Keyser
Inventor.
Robert R. Waitz.
By Paine Grafton & Ladd
Attorneys.

UNITED STATES PATENT OFFICE.

ROBERT R. WAITZ, OF ROSITA, COLORADO.

ORE-FURNACE.

SPECIFICATION forming part of Letters Patent No. 251,007, dated December 13, 1881.

Application filed August 6, 1881. (No model.)

*To all whom it may concern:*

Be it known that I, ROBERT R. WAITZ, a citizen of the United States, residing at Rosita, in the county of Custer and State of Colorado, have invented certain new and useful Improvements in Reverberatory Furnaces for Heating or Roasting Ores; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to furnaces for heating or roasting ores, in which the latter are subjected to the simultaneous action of heat and atmospheric air to destroy certain combinations and to decompose the sulphur, arsenic, and other substances present in the ores.

The object of the invention is to provide a reverberatory furnace of a novel construction, in which the ores are more thoroughly subjected to the action of the products of combustion than in furnaces heretofore known. Special provision is also made for dispensing with the customary "cold-air blast" for effecting the desulphurization of the ore by causing a requisite amount of hot air to pass from the fire-chamber into the roasting flue or passage, as will hereinafter be more fully described.

In the accompanying drawings, Figure 1 is a vertical longitudinal section of a roasting-furnace constructed according to my invention. Fig. 2 is a transverse horizontal section of the same.

The letter A designates the fire-chamber, which is provided with a suitable grate, $a$, and is of such a size and shape as to hold a large amount of heated air above the fuel-bed and render unnecessary a frequent opening of the doors to replenish with fuel. A passage or flue leading from the top of the fire-chamber communicates with a roasting or ore-heating flue, B, of a peculiar construction, as is shown in Fig. 1. Said passage or roasting-chamber is terraced or step-shaped, so as to form a series of inclined planes, C, D, E, and F, and a horizontal floor, G, at the base of the lowermost inclined plane. A hopper, H, located at the upper end of the uppermost inclined plane, receives the pulverized ore and feeds it to the roasting chamber or passage. The latter is made wide and comparatively low in height, so as to cause the ore to spread and descend in thin layers. The ascending heat or products of combustion and the atmospheric air mingled therewith encounters the descending ore and serves to thoroughly heat or roast the same for driving off all volatile substances and oxidizing other constituents of the ore. The volatilized matters and the products of combustion pass off through a flue, I, at the upper end of the roasting-passage, and such metallic particles as are carried up by the draft are intercepted and deposited in the dust-box $e$, located in proper relation to said discharge-flue I. The furnace is constructed of masonry, or in any other approved manner, and the interior of the inclined or descending ore-passage is lined with a refractory substance. Each inclined plane or terrace of the ore-passage has an opening, J, at each side, for gaining access thereto for cleaning, raking, or other purposes. These openings are arranged in a diagonal manner, so as to enable a tool or implement to be worked more conveniently and satisfactorily than if the openings were arranged in line with each other. Suitable doors, M, are employed for closing the openings in the ore-passage. The ore falls from the inclined passage onto the discharging hearth or platform G, and an opening, N, in the latter serves to convey it into a cooling-chamber or onto a cooling-floor N.

I am aware that an ore-roasting furnace having a single inclined roasting-hearth is not new, and that a roasting-flue provided with reversely-inclined plates for causing the ore to take a tortuous or zigzag course has heretofore been proposed.

Furnaces of the above construction are defective in several particulars, chiefly for the reason that a large percentage of metal is carried upward by the ascending draft and lost in the chimney. The ore also is not subjected to the action of the heat in as perfect a manner as in the furnace devised by me.

It will be obvious that the series of terraces form angles or deflecting-surfaces for causing the ascending sheet of flame to have an impeded passage through the roasting-flue. In this manner the ore is exposed to the flame for a longer period of time than if the flue were formed of a single incline, and it necessarily follows that valuable metals are retained in the furnace.

Having thus described my invention, what I claim as new, and desire to secure by Letters Patent, is—

In a reverberatory ore-roasting furnace, the inclined roasting flue or hearth, contracted in height and having a series of terraces, forming deflecting surfaces or angles, in combination with a bottom discharge-floor and fire-chamber and upper feed-hopper, as and for the purpose set forth.

In testimony whereof I affix my signature in presence of two witnesses.

ROBERT R. WAITZ.

Witnesses:
CHARLES W. PETTIT,
A. M. LONG.